Patented Dec. 7, 1943

2,336,208

UNITED STATES PATENT OFFICE 2,336,208

CONDENSATION PRODUCT

Kurt Alder, Cologne-Deutz, and Hans-Ferdinand Rickert, Cologne-on-the-Rhine, Germany; vested in the Alien Property Custodian No Drawing. Application December 17, 1938, Serial No. 246,492. In Germany December 22, 1937

2 Claims. (Cl. 260—488)

The present invention relates to new condensation products and to the process of preparing the same.

The so-called "diene-synthesis" (confer "The Chemistry of Synthetic Resins" by Carleton Ellis, 1935, volume II, page 830) resides in the addition of compounds containing two conjugated C=C double linkages with such compounds containing an ethylene or acetylene group wherein the said unsaturated linkage is likewise conjugated with another double bond. In general, the "diene-synthesis" proceeds in the following manner:

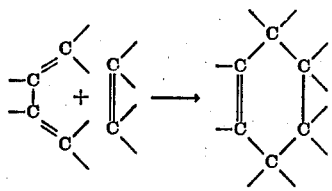

or

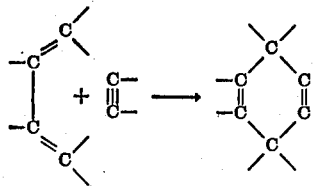

it being understood that in the reaction component designated by symbol B the unsaturated linkage is activated by another double bond as stated above. Examples for compounds of type B are 1,3-dienes, $\alpha,\beta$-unsaturated aldehydes, ketones, carboxylic acids and carboxylic acid nitriles.

The present invention is based on the observation that the "diene-synthesis" is not restricted to the situations as defined above. We have found that certain unsaturated compounds containing a single C=C double linkage which is not activated by another unsaturated bond, are likewise capable of forming addition products of the character described, if reacted upon with compounds containing two conjugated C=C double linkages. Starting materials of the first type are vinyl esters of organic acids, vinyl halogenides, dihalogen and trihalogen ethylenes. Compounds of the latter type are those commonly employed in the diene-synthesis such as butadiene-1,3, isoprene, 2,3-dimethylbutadiene-1,3, cyclopentadiene, cyclohexadiene and anthracene.

The reaction is performed by simply heating the mixture of the starting materials, preferably in a closed vessel. As a matter of fact care must be taken that the reaction is performed under such conditions as to prevent any substantial polymerization. To this end, polymerization inhibitors such as hydroquinone, pyrogallol and the like may be added to the reaction mixture, particularly in case of working with butadiene-1,3, isoprene and 2,3-dimethylbutadiene. As stated above, the reaction is performed at an elevated temperature, it being impossible to give definite lower and upper limits, since the optimum reaction conditions depend on the nature of the starting materials and on the tendency of the butadienes and the like to form dimeric products. In general, the dimerization process occurs more slowly than the addition of the 2 reaction components. On the other hand, some of the dimeric products may be split up into the monomeric products at a high temperature, whereas the addition products formed by the interaction of the 2 reaction components are stable at such temperatures. Thus, in case of cyclopentadiene the reaction is preferably performed at 180° C. as at this temperature the dimerics are split up so that the addition process is nearly quantitative. Other dienes such as anthracene do not show any tendency to form dimerics at the usual reaction temperature.

The following examples illustrate the present invention without, however, restricting it thereto, the parts being by weight unless otherwise stated:

Example 1

100 parts of freshly distilled monomeric cyclopentadiene and 150 parts of vinyl acetate are heated in an autoclave for 14 hours to 180–190°. After distilling off at normal pressure the excess vinyl acetate, the reaction mixture is subjected to distillation in vacuo. At 11 mm. pressure the following three fractions are obtained:

| | Parts |
|---|---|
| I: 73–77° | 100 |
| II: 77–140° | 10 |
| III: 140–150° | 48 |

Fraction I represents the addition product of the components in the proportion 1:1. It has an intensively ester-like smell and corresponds to the following constitution of a $\Delta^3$-norbornylene-ol-1-acetate:

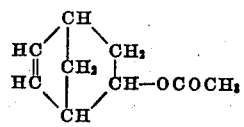

By saponification there is obtained the hitherto unknown alcohol, viz. the $\Delta^3$-norbornylene-ol-1 of the melting point 108–109°. The hydrotriazole prepared therefrom by the addition of phenylazide has the melting point 147–148°. By hydrogenation of the alcohol in an acetic acid solution with platinum oxide the α-norborneol is obtained which is described in Annalen der Chemie, vol. 512, 172 (1934). Fraction III represents the addition product of 2 mols of cyclopentadiene and 1 mol of vinyl acetate. The said compound corresponds to the following constitution:

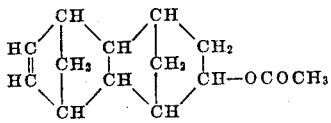

By saponification with methylalcoholic potassium hydroxide there is obtained therefrom the corresponding unsaturated alcohol of melting point 83°, which yields with phenylazide a hydrotriazole of melting point 194–195°.

*Example 2*

When replacing in the preceding example the 150 parts of vinyl acetate by 100 parts of vinyl formate and working under the same conditions, the formates of the two alcohols are obtained in form of colorless oils of boiling point 75–80° (at 20 mm. pressure) or 140–143° (at 20 mm. pressure) respectively.

*Example 3*

When heating equal parts by volume of butadiene-1,3 and vinyl acetate with the addition of polymerization inhibitors for 12 hours in an autoclave and distilling off the reaction mixture in vacuo, there is obtained besides some unchanged vinyl acetate and dimeric butadiene the addition product of the components, i. e. the $\Delta^3$-cyclohexane-ol-1-acetate in form of a colorless oil of boiling point 173–175° which corresponds to the following formula:

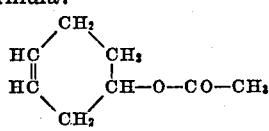

This compound, if subjected to catalytic hydrogenation takes up the amount of hydrogen corresponding to one double linkage, cyclohexanol acetate being formed thereby. By saponification with alcoholic potassium hydroxide the cyclohexanol of boiling point 155–156° is obtained therefrom, the phenyl urethane of this alcohol showing a melting point of 82°.

*Example 4*

When replacing in Example 3 the butadiene by 2.3-dimethyl butadiene and working up in the usual manner there is obtained the 3,4-dimethyl-$\Delta^3$-cyclohexene-ol-1-acetate in form of a colorless oil of an intensively ester-like smell which on saponification with methylalcoholic potassium hydroxide is converted into the corresponding alcohol (phenyl urethane of melting point 112° C.).

*Example 5*

By the addition of $\Delta^{1,3}$-cyclohexadiene and vinyl acetate there is obtained, when working according to the preceding examples, the bicyclic acetate of the following constitution:

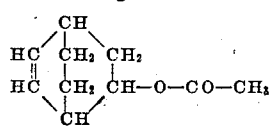

which is converted into the corresponding unsaturated alcohol (phenylurethane of melting point 125–126°) by saponification with methylalcoholic potassium hydroxide.

*Example 6*

10 parts of anthracene in 120 parts of xylene are heated in an autoclave for 18 hours to 220–230° with the addition of 20 parts of vinyl acetate. The reaction being complete, the solvent and the excess vinyl acetate are evaporated, whereby the residue partly crystallizes; on sucking off and rinsing with methanol the precipitate proves to be identical with unchanged anthracene (1 part).

After a short time the methanol containing mother liquor forms a mass of crystals which represent the addition product of the components. On dissolving from alcohol colorless crystals of melting point 101° C. are obtained which probably correspond to the following constitution:

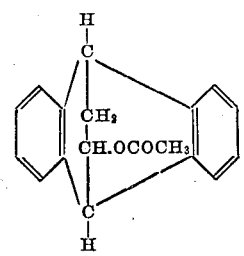

On saponification the ester yields the corresponding alcohol of melting point 142°.

*Example 7*

80 parts of vinyl chloride and 80 parts of cyclopentadiene are heated in an autoclave for 15 hours to 170–180°. On distilling off the unchanged vinyl chloride the residue is fractionated in vacuo. At 11 mm. pressure the following two fractions are obtained:

| | Parts |
|---|---|
| I: 46–47° | 73 |
| II: 128–131° | 28 |

Fraction I represents the chloride of the following constitution:

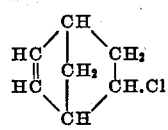

The hydrotriazol which is obtained therefrom by the addition of phenylazide melts at 115–116°.

Fraction II represents the addition product of 2 mols cyclopentadiene and 1 mol of vinyl chloride of the following constitution:

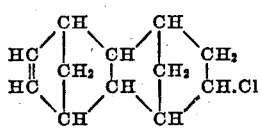

With phenylazide a hydrotriazol of melting point 195° is obtained.

*Example 8*

By a 15 hours' heating of 175 parts of 1,2-dichloroethylene with 125 parts of cyclopentadiene in an autoclave and after distilling off the reaction product in vacuo at 11 mm. pressure as described in Example 7, there are obtained the following two addition products of 1 or 2 mols of cyclopentadiene and 1.2-dichloroethylene:

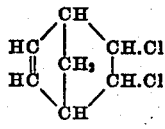

of boiling point 74–76° at 11 mm. pressure; the hydrotriazol shows the melting point 148°; and

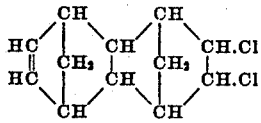

of boiling point 146–148° at 11 mm. pressure; the hydrotriazol shows the melting point 210°.

*Example 9*

When adding trichloro-ethylene to cyclopentadiene while heating the components in an autoclave at 175–185° the addition product of 2 mols of the latter and the trichloroethylene of the following constitution is obtained:

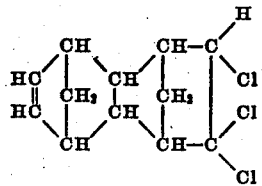

This compound represents a colorless oil which boils in vacuo at 11 mm. pressure at 158–160°. With phenylazide it yields a hydrotriazole of melting point 225–226°.

We claim:

1. The process which comprises heating a hydrocarbon compound containing two conjugated C=C double linkages with a vinyl ester of organic acids, the reaction being performed under such conditions as to prevent any substantial polymerization.

2. The process as claimed in claim 1 wherein the reaction is performed in the presence of a polymerization inhibitor.

KURT ALDER.
HANS-FERDINAND RICKERT.